Aug. 12, 1969

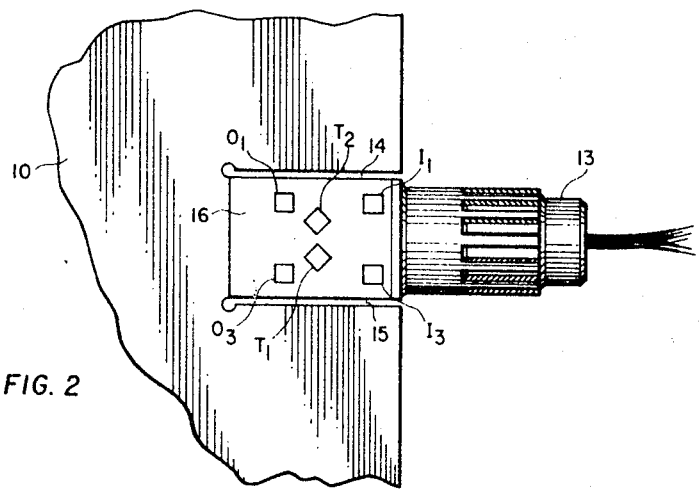
FIG. 2
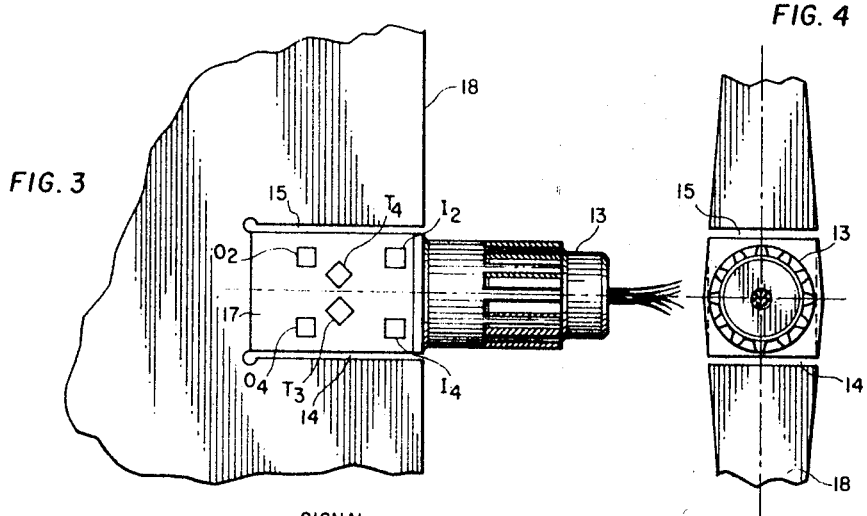
FIG. 3
FIG. 4
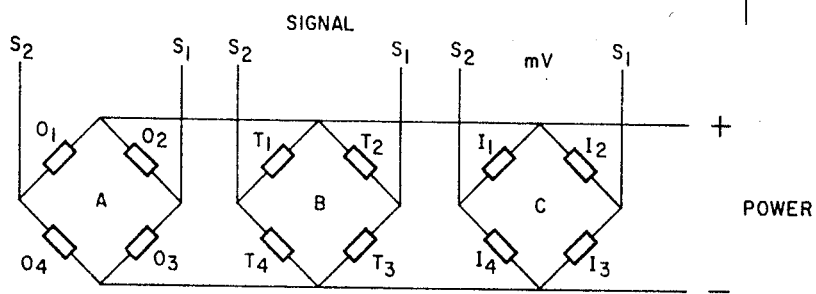
FIG. 5

C. J. PADERA 3,460,383

CONTROL SURFACE HAVING FLEXURE AREAS
FOR FORCE MEASUREMENTS

Filed May 22, 1967

INVENTOR.
CHARLES J. PADERA

BY Julian C. Renfro
ATTORNEY

United States Patent Office 3,460,383
Patented Aug. 12, 1969

3,460,383
CONTROL SURFACE HAVING FLEXURE AREAS FOR FORCE MEASUREMENTS
Charles J. Padera, Winter Park, Fla., assignor to Martin-Marietta Corporation, New York, N.Y., a corporation of Maryland
Filed May 22, 1967, Ser. No. 640,234
Int. Cl. G01m 9/00
U.S. Cl. 73—147         9 Claims

ABSTRACT OF THE DISCLOSURE

This invention relates to the measuring of forces on control surfaces or fins of missiles, models of missiles, or any of a variety of models used in wind tunnels or hydrodynamic tanks, wherein flow over the control surface creates forces and moments that must be accurately ascertained in order that the proper size shaft for supporting the control surface will be used, and the proper size actuator employed. To that end I provide novel flexure areas on each side of the control surface closely adjacent the shaft, upon which I dispose a plurality of strain measuring devices so that the distortions of the flexure areas can be accurately translated into indications of forces and moments, this being accomplished without utilizing any instrumentation inside the model upon which the control surface is mounted.

---

This invention relates to an improved arrangement for measuring forces on control surfaces of aerodynamic or hydrodynamic models, and more particularly to the use of fins or control surfaces having novel flexure areas so configured as to enable the accurate utilization of strain gages or the like on the exterior of the control surfaces, thus making it unnecessary for any force measuring instrumentation to be located in the interior of the model.

In the past, a number of arrangements have been utilized for measuring the forces on the control surfaces or fins, such as may be used in wind tunnel models or the like. These control surfaces have been mounted on shafts that extended inside of the fuselage of such models, with certain apparatus being used inside the fuselage to enable placement of the strain measurement devices. However, this type of arrangement had several disadvantages, one being that the fuselage could be no smaller than a certain minimum size. This of course placed a minimum limit on the size of the control surfaces that could be utilized in the testing procedure.

Additionally, the prior art construction techniques dictated the use of bearings at or near the location where the shafts passed through the fuselage, which bearings were not only expensive, but also prone to become contaminated with dust particles and therefore cause erroneous readings.

In accordance with the present invention, I have proposed a novel arrangement in which a novel measurement area is created on each side of the control surface or fin immediately adjacent its shaft. Each area, otherwise known as a flexure area, is bounded by a pair of slots extending generally in the direction of the shaft, with these slots being generally parallel to each other so as to define on opposite sides of the control surface, a pair of measurement areas of the same size. These slots direct stress resulting from loads on the control surface, to flow in such a manner as to provide an excellent location for mounting strain gages or the like, so that very accurate readings can be taken. Such strain gages are located so as to effect the type of measurement desired. For example, bending moment can be established by the four strain gages nearest the fuselage, that is for a horizontally disposed fin, two strain gages on the upper measurement area, and two on the lower measurement area, utilized in a bridge arrangement. Bending moment may also be determined from four strain gages disposed on the flexure area at locations further from the fuselage, with these two bending moments together with spacing information enabling the center of pressure location of the control surface to be ascertained.

By the use of four strain gages disposed at say a 45° angle to the direction of shaft, torsion can also be determined. Thus it may be seen that, for example, by the use of twelve properly placed strain gages, sufficient information may be determined as to make it possible to ascertain how large an actuator is necessary for use with the fin, and how large the shaft must be. Also, hinge moment levels can be established, which can be used in determining the type or types of actuators required. It should be noted that no aerodynamic (or hydrodynamic) penalty is involved, for the measurement areas are restored to the proper contour subsequent to the attachment of the strain gages. The flexure portions defined by the slots and the upper and lower measurement areas may be rectangular, diamond shaped, a modified diamond shape, or other configuration, depending on the magnitude of forces involved, and type of data sought.

This invention is not limited to scale models, for it obviously can be used in conjunction with control surfaces of even full size models.

It is therefore a principal object of this invention to provide a novel measurement arrangement involving the creation of flexure areas on each side of a control surface or fin of a full scale of partial scale model, upon which areas, measurements indicative of forces on the fin can be accurately made, thus avoiding the necessity of employing measurement techniques involving the interior of the fuselage of the model.

These and other objects, features and advantages will be more apparent from a study of the enclosed drawings in which:

FIGURE 2 is a fragmentary view to a somewhat larger scale, revealing the manner in which strain gages may be placed upon the upper measurement area used on a horizontally disposed control surface;

FIGURE 3 is a view similar to FIGURE 2, but revealing the placement of strain gages on the lower measurement area of such control surface;

FIGURE 4 is an end view relatable to FIGURE 3, this view illustrating in a greater detail the slots that border the measurement areas of this first embodiment;

FIGURE 5 is a wiring diagram revealing the electrical relationships of the various strain gages to a power supply as well as to the readout means;

Figure 1:
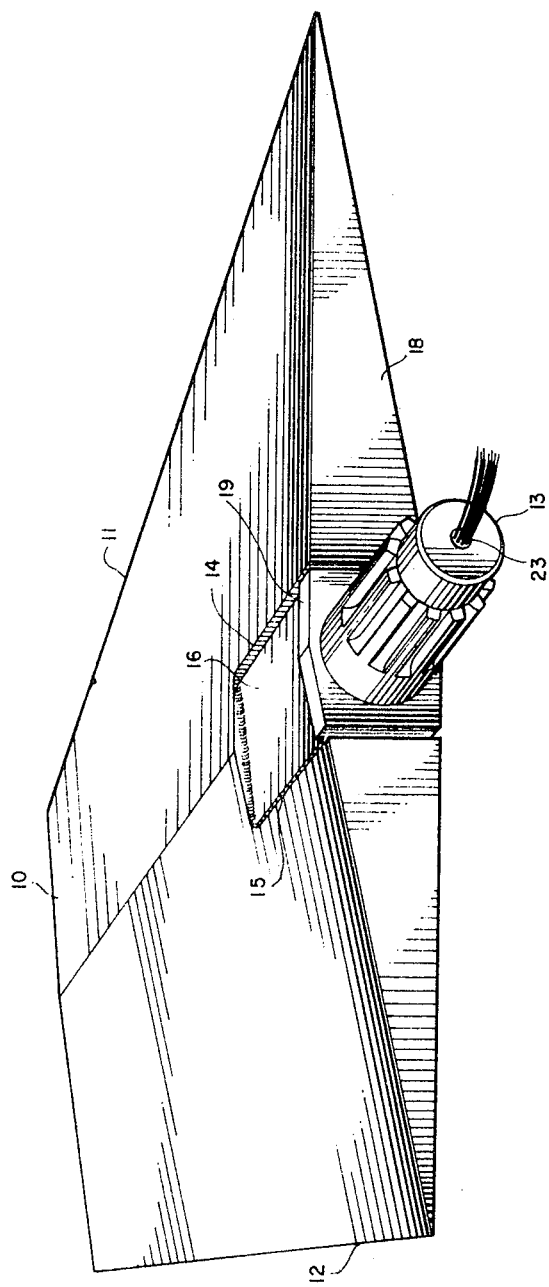
FIGURE 1 is a perspective view of a typical control surface, in this instance horizontally disposed, illustrating a rectangular shaped flexure portion, upon upper and lower measurement areas of which, strain gages are to be placed.

Referring to FIGURE 1, it will be noted that control surface 10 has a leading edge 11, a trailing edge 12, as well as a mounting shaft 13. By way of illustration, the control surface 10 may be made of a high grade of heat treated stainless steel, such as 17–4 PH. I am of course not to be limited to such material, for depending on size and use, obviously a control surface could be made of aluminum, wood, plastic, or other such material, or some combination thereof. I prefer that the shaft 13 be made from the same piece of material as that from which the rest of the control surface is made, but again, this is not a definite requirement, for an insert containing the shaft 13 could be made adjacent the root chord 18 of the control surface if such is for some reason desirable. Hole 23 is provided on the centerline of shaft 13, through which instrumentation leads can pass.

In accordance with a first embodiment of this invention, thin slots 14 and 15 are cut through the root chord 18 of the control surface, extending toward the tip for a given distance, thus to define a rectangular flexure portion having an upper measurement area 16 and lower measurement area 17. In FIGURE 1, the fin is generally horizontally disposed, with the slots being substantially parellel with each other, and with the planes of the slots being parallel and vertical. However, parallelism is not a rigid requirement, for the slots could be somewhat convergent, or in other words, the vertically disposed planes representing the slots of a horizontally disposed fin could converge as long as such planes are symmetrical about the centerline of the shaft 13, and the planes would converge either on the centerline, or on an imaginary extension of the centerline.

The lengths of the slots can be fairly substantial, as long as the strength of the fin is not markedly decreased. The slots need not be precisely straight, for as long as the areas of the upper and lower measurement areas are the same, the high accuracy inherent in this arrangement will be preserved. The slots may each be say .015" to .020" thick, and may be cut by an elox process, involving electrical discharge machining.

The first three figures of drawing reveal the manner in which slots 14 and 15 define the upper and lower measurement areas 16 and 17. These areas, otherwise known as flexure areas, in this instance are substantially flat and parallel to each other, and because of the presence of the slots 14 and 15, stresses are isolated to the measurement areas, the slots serving to direct the stresses in a defined pattern. Because these areas distort in such a manner as to accurately reflect the forces resulting from fluid flow over the fin, a plurality of strain gages may be secured to each measurement area and thus obtain strain measurements which are relatable to the forces acting on the fin.

As shown in FIGURES 2 and 3, the strain gages are laid out on the flexure areas in a particular pattern with respect to each other, so that upon the strain gages being wired into appropriate bridge arrangements of the type shown in FIGURE 5, accurate readings may be taken which reflect two bending moments as well as the torsion to which the shaft is subjected. The gage pattern centerlines must coincide with the centerline of the respective flexure area in order to minimize interactions between the forces to be measured, and thus achieve a desirably high degree of accuracy. By proper utilization of the output difference between the two bending moment bridges and the distance between them, the center pressure of the surface can be determined. The normal force is the difference between the outputs of the two bending gages divided by the distance along the shaft centerline between the bending moment gages. These details will be discussed at greater length hereinafter.

Reference should now be made to FIGURES 2 and 3, wherein six strain gages are disposed on each of the measurement areas. In the interests of clarity, the tiny wires associated with the strain gages have been omitted from these figures. In FIGURE 2, which of course represents a top view, the strain gages on measurement area 16 that are nearest the end of the shaft to be inserted in the fuselage of the model are designated $I_1$ and $I_3$, whereas the strain gages on the outer portion of this measurement area are designated $O_1$ and $O_3$. In the event of a downward load on the control surface as viewed in FIGURE 2, this of course will place all four of these strain gages in tension.

Conversely, and with reference to FIGURE 3, strain gages $I_2$ and $I_4$ represent the strain gages on the inner portion of measurement area 17, whereas strain gages $O_2$ and $O_4$ are disposed at the outer portion of this measurement area. In the condition assumed with regard to FIGURE 2, that is, with a downward load upon the upper surface of the control surface, strain gages $O_2$ and $O_4$ and $I_2$ and $I_4$ of FIGURE 3 will be placed in compression.

The preferred electrical arrangement of these strain gages is shown in FIGURE 5, wherein strain gages $O_1$ thru $O_4$ are disposed in a clockwise arrangement referred to as bridge A, and strain gages $I_1$ thru $I_4$ are disposed in a clockwise arrangement referred to as bridge C. In this instance, the gages in tension are in diagonal locations, as are the gages in compression. In other words, in the assumed conditions, $O_1$ is in tension, $O_2$ in compression, $O_3$ in tension, and $O_4$ in compression.

The foregoing arrangement of strain gages enables two different bending moment readings to be made utilizing the instrumentation associated with each of these bridges, and by knowledge of certain distances associated with the strain gages, the readings from the instruments can be used in ascertaining the normal force on the control surface. For example, the normal force on the fin may be calculated from the difference between the two bending moment readings, divided by the distance along the shaft centerline between the gages, and the root bending moment is determined by transferring one of the bending moment gage readings to the root chord 18.

It is also important to note that torsional force can be measured, and to that end I prefer to place strain gages $T_1$ and $T_2$ on the measurement area 16 shown in FIGURE 2, with each of these strain gages disposed at say a 45° angle to the centerline of shaft 13. Similarly, strain gages $T_3$ and $T_4$ are placed on measurement area 17 at say a 45° angle to shaft 13.

As shown in bridge B in FIGURE 5, strain gages $T_1$ through $T_4$ are also arrayed in a clockwise arrangement, with the preferred arrangement being such that when a clockwise twisting effort is applied to shaft 13, tension is applied to $T_2$ and $T_4$ and compression is applied to strain gages $T_1$ and $T_3$. In this manner, the meter associated with bridge B can provide a readout of torsion.

Approximately 1.5 to 3 volts DC are supplied to the bridges by leads, with the output from each bridge being taken off leads $S_1$ and $S_2$ associated with each bridge. Such leads preferably extend from the bridges into diagonally placed holes drilled in the edge of a flexure area, and angled toward the hole 23 disposed on the centerline of the shaft. Thereafter these leads reside along centerline hole 23, exit into the fuselage of the model, and thereafter connect to appropriate, remotely located instrumentation.

As an example of the instrumentation employed with bridge A through C, I have used a Datran, model A110, a Digital Strain indicator manufactured by Budd Instruments Division of Phoenixville, Pa. Other strain measuring devices suitable for this purpose are manufactured by companies such as Beckman, Baldwin-Lima-Hamilton, and Leeds & Northrup.

It must be borne in mind that this invention is not limited to use with fins having a symmetrical planform, such as triangular or rectangular. For example, the fin may have a leading edge that possess far more sweep than the trailing edge. In such an instance, the upstream slot may not be as long as the downstream slot. Also, the position of the shaft installation along the root chord is not of particular consequence insofar as this invention is concerned, for as long as the flexure areas are symmetrical with the centerline of the shaft, and the strain gage pattern is symmetrical with the flexure area, readings within an accuracy range of ¼% to ½% may be obtained. Further, the strain gage configuration on one flexure area need not be the same size as the strain gage configuration on the other flexure area, or in other words, the strain gages of one configuration could be spread further apart than the gages of the other configuration. The immediately foregoing statements presume of course that the aforementioned symmetry of each strain gage arrangement about the centerline of the shaft 13 is preserved.

As to the type of strain gages I preferably utilize, these should be selected to have the same coefficient of expansion as the flexure area to which they are to be bonded. When working with fins of stainless steel, I prefer to use Micro-Measurement gages having the designation MA–06–050AH–120. These gages, manufactured by Micro-Measurements, a division of Vishay Intertechnology, Inc., Romulus, Mich., are a general purpose miniature gage. The twelve character designation used with each different gage of this manufacturer reveals pertinent information. In this instance, the letter M reveals that the backing material is a high functionability epoxy; the letter A indicates that the grid alloy is constantan; the 06 reveals that the self-temperature-compensation is suitable for use with stainless steel; and the 050 reveals that the active gage length is 50 mils long. The remainder of the designation reveals other pertinent information. Manifestly, I am not to be limited to either this gage, or to the gages of this particular manufacturer.

Depending upon the application to which the control surface is to be subjected, various type cements may be used for bonding the strain gages to the flexure area. If high temperatures are to be encountered, I prefer to use phenolic base compounds, whereas if lower temperatures are involved and the device is to be subjected to higher stress levels, then I use epoxy base compounds. The strain gages are temperature compensated in the respective bridges by changing the resistance of the appropriate leg of a bridge as may be necessary. After being completed, the bridges are preferably sprayed with gage coat, in order to exclude moisture.

The output of each bridge is precalibrated with known weights hung at a known distance from the electrical center of each bridge. Proper placement of the gages can be checked by fixing the shaft, placing a weight on the centerline of the control surface to get an initial reading indicative of bending moment, and then moving the weight across the tip or end of the control surface on a line perpendicular to the shaft 13 to see if bending moment values change. Similarly, torsion values can be checked by moving the weight along the leading or trailing edge of the control surface on a line parallel to the centerline of shaft 13 to ascertain if such torsion values change.

The voltage output per inch pound of moment is converted to digital units, that are normally printed out automatically during the data acquisition period.

It is important to note that the provision of measurement areas in accordance with this invention does not bring about an aerodynamic (or hydrodynamic) penalty, for by the use of hard rubber, plastic, or epoxy, I restore the surface of the fin to the proper contour. However, such material is not used in the slots 14 or 15, for such would interfere with the accuracy of my system. Instead, after all electrical leads associated with the bridges are in place, I utilize a moderately firm potting rubber, or other easily deformable material in the slots. I prefer for this material to extend above the slots for a distance, so as to form low side edges or boundaries, in contact with which the hard rubber, plastic or epoxy is placed at which time the contour in the vicinity of the flexure area is restored. In FIGURES 1 through 4 it will be noted that boundaries are maintained at the ends of the measurement areas, as exemplified by dam 19 in FIGURE 1. The dam of course furnishes useful information as to the "original" contour of this portion of the fin, at such time as the hardenable material is being added for restoration purposes.

Figure 6:
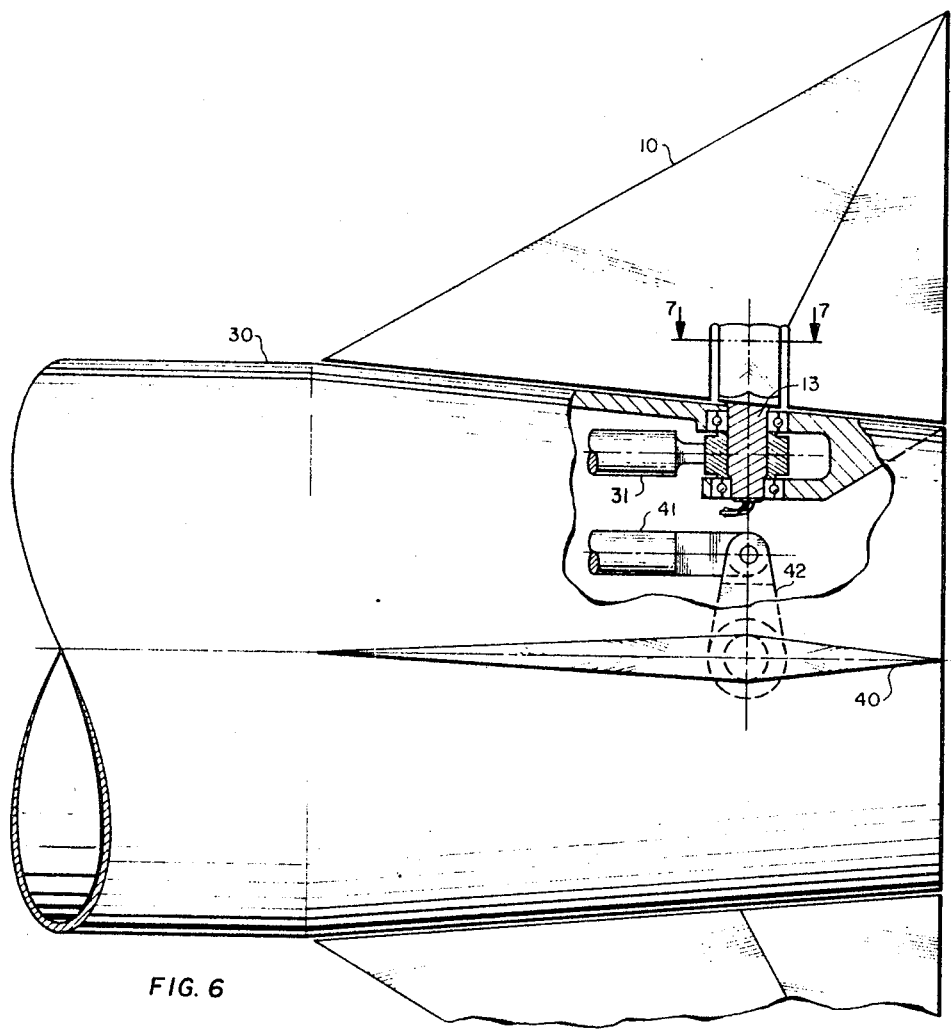
FIGURE 6 is a side elevational view revealing the actuator shaft details associated with vertically disposed as well as horizontally disposed control surfaces.

Referring to FIGURE 6, it will not noted that fin 10 is horizontally disposed, with its shaft 13 extending into the fuselage 30, and being engaged in appropriate linkage and fittings for bringing about deflection of the fin in response to movements of push rod 31. Push rod 31, as well as push rod 41 associated with vertically disposed fin 40, are each connected to an appropriate arm having aperture therein for receiving in close fitting relationship, the splined shaft associated with a fin. In the instance of fin 40, the splined shaft thereof interfits into an aperture of arm 42 so that by longitudinal movement of push rod 41, left and right movements of fin 40 are brought about.

As will be obvious from FIGURE 6, a pair of bearings may be utilized in connection with each shaft, so that it can turn easily in fuselage 30, but it should be noted that inasmuch as it is not necessary to utilize strain gages on the interior of the fuselage, any possible contamination of the bearings is of no particular consequence. Also, if heavy forces are to be involved, I may prefer to use bushings in lieu of bearings, at no penalty insofar as accuracy is concerned. For reasons of accuracy, bushings could not have been used in prior art arrangements in place of bearings.

As to the preferred cross sections associated with the flexure areas, the rectangular configuration indicated in FIGURE 4 is utilized when the load-carrying ability of a diamond or modified diamond flexure portion would not be adequate. In the instance of a rectangular cross section of the type described in FIGURES 1–4, the torsion gages are disposed diagonally at the midpoints of the flats, and the gages associated with the measurement of bending moments are placed near the corners of the measurement areas, as discussed in detail in connection with FIGURES 2 and 3.

Referring to the embodiment of 7a, it will be noted that the flexure portion defined by the flexure areas in this instance forms a diamond-shaped configuration, which is excellent for use when hinge moments are to be measured. Since the strain gages in this embodiment are measuring shear due to torsion, a single bridge involving a total of four pages is used, the gages of which are diagonally disposed at the midpoint location of each side, where maximum shear stresses occur. Bending moment gages are not used in conjunction with this configuration, and, as a matter of fact, bending stress influence on the torsion stresses is minimized, inasmuch as maximum bending stresses are at the outermost fibers, and not in the vicinity of the torsion gages.

Figure 7A:
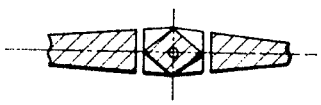
FIGURES 7a and 7b reveal two other embodiments of flexure portions that may be utilized in accordance with this invention, at the location identified in FIGURE 6 by the arrows 7—7.
Figure 7B:
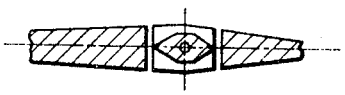

FIGURE 7b illustrates an embodiment in which the cross section of the flexure portion is in the form of a modified diamond, in which the four gages concerned with measuring torsion are disposed on the angled flats adjacent the pointed fore and aft ends of the flexure portion. In this embodiment, two sets of four bending moment gages are used on the horizontally disposed upper and lower portions of the flexure area, wired of course into two bridge arrangements like that of the embodiment in accordance with FIGURES 1–4. In other words, the four torsion gages are used in a bridge like bridge B of FIGURE 5, and the eight bending moment gages are employed in the manner described in connection with bridges A and C.

It should be noted with regard to the embodiments in accordance with FIGURES 7a and 7b that after the strain gages are in place, and the slot portions have been filled with soft material, that I prefer to add hard rubber, plastic, epoxy or other appropriate hardenable material in sufficient quantity to "restore" the flexure portion back to a configuration that conforms with the rest of the fin surface.

Although for accuracy reasons I prefer the slots bordering the measurement areas to extend entirely through the fin, it is to be understood that partial slots could be extended from both the upper and lower surfaces, and be of a depth such that only a thin membrane of the parent material of the fin remains between the flexure portion and the rest of the fin, such membrane being disposed at the centerline of the plane.

In all of the views in which slots are illustrated, the widths of the slots have been exaggerated for reasons of simplified explanation.

No invention is predicated on the electrical bridge arrangements per se, for such are old in strain gage devices, as exemplified by the Curry Patent No. 3,159,027 in FIGURE 20.

As will now be seen, I have provided several embodiments of an invention that enables measurement, in a very accurate manner, of a number of components, these being hinge moment, center of pressure location, and normal force. By providing additional strain measuring devices at proper locations on the sides of the flexure portions in the embodiment according to FIGURES 1–4 (that is, at locations within slots 14 and 15), I could also measure axial force as well as axial force center of pressure.

Although I have only shown a limited number of embodiments and disclosed only preferred utilization of my invention, it is to be understood that my invention has other and further utilizations.

I claim:

1. An arrangement for ascertaining forces on or associated with a fin supported in a fluid flow by a shaft, comprising a fin having thereon a pair of measurement areas at least partially defined by a pair of slots disposed generally parallel to said shaft, said measurement areas being disposed on opposite sides of said fin at a location adjacent said shaft, through which areas the stresses resulting from forces on said fin will be funneled, and means for sensing distortion of said measurement areas, thus to obtain an indication of the forces applied to said fin.

2. The arrangement as defined in claim 1 in which said measurement areas are substantially flat, and together with a slot on each side of said shaft define a flexure portion that in cross section is substantially rectangular.

3. The arrangement as defined in claim 1 in which said measurement areas form a configuration that in cross section is substantially diamond shaped.

4. The arrangement as defined in claim 1 in which said measurement areas form a configuration that in cross section is a modified diamond shape.

5. A measurement arrangement for ascertaining forces on or associated with a control surface of a dynamic model having a supporting structure, comprising a control surface, a mounting shaft extending from said control surface, and into said supporting structure, a pair of measurement areas disposed on opposite sides of said control surface adjacent said shaft, said measurement areas being defined by the creation of slots in generally symmetrical relationship to said shaft, so as to define said pair of measurement areas of substantially the same size through which the stresses resulting from forces on said control surface will be funneled, and means for establishing the amount of strain present in said areas, so that the forces on said control surface can be ascertained.

6. The measurement arrangement as defined in claim 5 in which said measurement areas are substantially flat, and together with a slot on each side of said shaft define a flexure portion that is substantially rectangular in cross section.

7. The measurement arrangement as defined in claim 5 in which said measurement areas together define a flexure portion that in cross section is substantially diamond shaped.

8. The measurement arrangement as defined in claim 5 in which said measurement areas together define a flexure portion that in cross section is a modified form of diamond.

9. The measurement arrangement as defined in claim 5 in which said means for establishing the amount of strain present on said measurement areas comprises an array of strain gages, affixed to said measurement areas.

References Cited

UNITED STATES PATENTS 2,885,891   5/1959   Wilson et al. _____ 73—147

FOREIGN PATENTS 316,639   12/1919   Germany.
128,179   1/1959   Russia.

OTHER REFERENCES

National Advisory Committee for Aeronautics; technical note 1594; by H. L. Runyan and J. L. Sewall, June, 1948, pp. 1–7, 15, 19, 21, 23, 25.

LOUIS R. PRINCE, Primary Examiner

JEFFREY NOLTON, Assistant Examiner

U.S. Cl. X.R.

73—88